(12) United States Patent
Fei et al.

(10) Patent No.: US 12,241,991 B2
(45) Date of Patent: Mar. 4, 2025

(54) METHOD FOR EVALUATING OVERLAPPING TARGETS

(71) Applicant: HELLA GmbH & Co. KGaA, Lippstadt (DE)

(72) Inventors: Tai Fei, Hamm (DE); Yuliang Sun, Leuven (BE)

(73) Assignee: Hella GmbH & Co. KGaA, Lippstadt (DE)

( * ) Notice: Subject to any disclaimer, the term of this patent is extended or adjusted under 35 U.S.C. 154(b) by 469 days.

(21) Appl. No.: 17/172,930

(22) Filed: Feb. 10, 2021

(65) Prior Publication Data

US 2021/0190900 A1 Jun. 24, 2021

Related U.S. Application Data

(63) Continuation of application No. PCT/EP2018/071730, filed on Aug. 10, 2018.

(51) Int. Cl.
*G01S 7/02* (2006.01)
*G01S 13/08* (2006.01)
*G01S 13/58* (2006.01)
*G01S 13/931* (2020.01)

(52) U.S. Cl.
CPC .............. *G01S 7/021* (2013.01); *G01S 13/08* (2013.01); *G01S 13/58* (2013.01); *G01S 13/931* (2013.01)

(58) Field of Classification Search
CPC ... G01S 7/35; G01S 7/295; G01S 7/53; G01S 13/42; G01S 13/584; G01S 13/532
USPC ........................................................ 342/192
See application file for complete search history.

(56) References Cited

U.S. PATENT DOCUMENTS

| | | | | |
|---|---|---|---|---|
| 4,717,916 A | * | 1/1988 | Adams | G01S 13/4454 342/107 |
| 5,191,337 A | * | 3/1993 | Brovko | G01S 13/34 342/160 |
| 5,262,785 A | * | 11/1993 | Silverstein | G01S 13/522 342/162 |
| 5,262,789 A | * | 11/1993 | Silverstein | H01Q 3/22 342/368 |
| 6,498,581 B1 | * | 12/2002 | Yu | G01S 13/4463 342/147 |
| 7,652,617 B2 | * | 1/2010 | Kurtz | G01S 13/34 342/64 |
| 7,667,638 B1 | * | 2/2010 | Karam | G01S 7/295 342/149 |

(Continued)

OTHER PUBLICATIONS

International Search Report dated Apr. 23, 2019 in corresponding application PCT/EP2018/071730.

(Continued)

*Primary Examiner* — Vladimir Magloire
*Assistant Examiner* — Michael W Justice
(74) *Attorney, Agent, or Firm* — Muncy, Geissler, Olds & Lowe, P.C.

(57) ABSTRACT

A method for evaluating overlapping targets in a two-dimensional radar spectrum, wherein the following steps are carried out: providing the two-dimensional radar spectrum, selecting at least one region of interest as an input signal from the spectrum, and performing an evaluation of the input signal to determine an information about the overlapping targets, wherein the evaluation is specific for a model order selection method.

14 Claims, 3 Drawing Sheets

(56) References Cited

U.S. PATENT DOCUMENTS

| | | | | |
|---|---|---|---|---|
| 8,026,841 | B2* | 9/2011 | Liu | G01S 13/913 342/91 |
| 8,441,395 | B2* | 5/2013 | Kanamoto | G01S 13/426 342/149 |
| 8,466,830 | B2* | 6/2013 | Kanamoto | G01S 13/345 342/107 |
| 8,552,907 | B2* | 10/2013 | Kanamoto | G01S 13/48 342/149 |
| 8,581,777 | B2* | 11/2013 | Kanamoto | G01S 13/931 342/158 |
| 8,648,745 | B2* | 2/2014 | Kanamoto | G01S 3/74 342/158 |
| 8,912,951 | B2* | 12/2014 | Campbell | G01S 7/292 342/162 |
| 8,970,425 | B2* | 3/2015 | Nogueira-Nine | G01S 13/282 342/128 |
| 9,007,258 | B2* | 4/2015 | Kurono | G01S 13/42 342/146 |
| 9,250,318 | B2* | 2/2016 | Izumi | G01S 13/4409 |
| 9,268,008 | B1* | 2/2016 | Abileah | G01S 13/534 |
| 9,389,306 | B2* | 7/2016 | Nogueira-Nine | G01S 7/418 |
| 9,784,820 | B2* | 10/2017 | Arage | G01S 13/931 |
| 9,955,944 | B2* | 5/2018 | Huang | A61B 8/5207 |
| 10,031,224 | B2* | 7/2018 | Aoki | G01S 13/345 |
| 10,091,616 | B2* | 10/2018 | Prevatt | H01Q 1/246 |
| 10,310,065 | B2* | 6/2019 | Okamoto | G01S 13/34 |
| 10,401,485 | B2* | 9/2019 | Bilik | G01S 7/354 |
| 10,481,245 | B2* | 11/2019 | LaPat | G01S 13/18 |
| 11,313,960 | B2* | 4/2022 | Yamanouchi | G01S 13/42 |
| 2008/0106460 | A1* | 5/2008 | Kurtz | G01S 13/34 342/99 |
| 2010/0066586 | A1* | 3/2010 | Liu | G01S 13/34 342/33 |
| 2011/0156947 | A1* | 6/2011 | Kanamoto | G01S 13/426 342/107 |
| 2011/0193740 | A1* | 8/2011 | Kanamoto | G01S 13/345 342/158 |
| 2011/0309971 | A1* | 12/2011 | Kanamoto | G01S 7/295 342/147 |
| 2012/0038506 | A1* | 2/2012 | Kanamoto | G01S 13/584 342/158 |
| 2012/0194379 | A1* | 8/2012 | Kurono | G01S 13/345 342/147 |
| 2012/0268316 | A1* | 10/2012 | Kanamoto | G01S 13/584 342/158 |
| 2012/0313809 | A1* | 12/2012 | Testar | G01S 7/292 342/118 |
| 2012/0313810 | A1* | 12/2012 | Nogueira-Nine | G01S 13/282 342/128 |
| 2013/0229300 | A1* | 9/2013 | Izumi | G01S 7/4026 342/156 |
| 2013/0271310 | A1* | 10/2013 | Izumi | G01S 7/4008 342/368 |
| 2013/0271311 | A1* | 10/2013 | Izumi | H01Q 3/30 342/146 |
| 2013/0278456 | A1* | 10/2013 | Izumi | H01Q 3/30 342/146 |
| 2014/0002296 | A1* | 1/2014 | Izumi | G01S 13/345 342/149 |
| 2014/0022113 | A1* | 1/2014 | Nogueira-Nine | G01S 13/34 342/128 |
| 2014/0028493 | A1* | 1/2014 | Izumi | G01S 13/4454 342/149 |
| 2014/0097980 | A1* | 4/2014 | Campbell | G01S 7/292 342/90 |
| 2014/0266860 | A1* | 9/2014 | Blumrosen | G01S 15/66 367/87 |
| 2014/0364733 | A1* | 12/2014 | Huang | A61B 8/5207 600/443 |
| 2015/0042503 | A1* | 2/2015 | Morelande | G01S 13/42 342/27 |
| 2016/0084941 | A1* | 3/2016 | Arage | G01S 7/2921 342/91 |
| 2016/0091603 | A1* | 3/2016 | Aoki | G01S 13/931 342/70 |
| 2017/0097409 | A1* | 4/2017 | Okamoto | G01S 13/345 |
| 2017/0227625 | A1* | 8/2017 | Markhovsky | G01S 5/0226 |
| 2018/0003802 | A1* | 1/2018 | LaPat | G01S 13/18 |
| 2018/0035256 | A1* | 2/2018 | Prevatt | G01S 5/14 |
| 2018/0095173 | A1* | 4/2018 | Kurono | G01S 13/343 |
| 2018/0149738 | A1* | 5/2018 | Bilik | G01S 7/354 |
| 2018/0356509 | A1* | 12/2018 | Haghighi | G08B 13/1645 |
| 2020/0011986 | A1* | 1/2020 | Yamanouchi | G01S 13/42 |

OTHER PUBLICATIONS

Yingbo Hua: "Estimating Two-Dimensional Frequencies by Matrix Enhancement and Matrix Pencil", Speech Processing 1. Toronto, May 14-17, (International Conference on Acoustics, Speech & Signal Processing. ICASSP), New York, IEEE, US, vol. conf. 16, Apr. 14, 1991, pp. 3073-3076, XP010043675, DOI: 10.1109/ICASSP. 1991.150104, ISBN: 978-0-7803-0003-3.

Yingbo Hua: "Estimating Two-Dimensional Frequencies by Matrix Enhancement and Matrix Pencil", IEEE Transactions on Signal Processing, vol. 40, No. 9, Sep. 1992, pp. 2267-2280.

Florian Engels et al: Advances in Automotive Radar: A framework on computationally efficient high-resolution frequency estimation IEEE Signal Processing Magazine, vol. 34, No. 2, pp. 36-46, Mar. 2017.

Tai Fei et al: "A Novel Target Separation Algorithm Applied to the Two-Dimensional Spectrum for FMCW Automotive Radar Systems" 2017 IEEE International Conference on Microwaves, Antennas, Communications and Electronic Systems, IEEE, Nov. 13, 2017, pp. 1-6, XP033288651, DOI: 10.1109/COMCAS.2017.8244791.

Jean-Michel Papy et al: "A Shift Invariance-Based Order-Selection Technique for Exponential Data Modelling" IEEE Signal Processing Letters, vol. 14, No. 7 pp. 473-476, Jul. 2007.

Mati Wax et al: "Detection of Signals by Information Theoretic Criteria" IEEE Transactions on Acoustics, Speech and Signal Processing, vol. 33, No. 2, pp. 387-392, Apr. 1985.

Yingbo Hua et al: "Matrix Pencil Method for Estimating Parameters of Exponentially Damped/Undamped Sinusoids in Noise" IEEE Transactions on Acoustics, Speech and Signal Processing, vol. 38, No. 5, pp. 814-824, May 1990.

Roland Badeau et al: "Selecting the Modeling Order for the Esprit High Resolution Method: An Alternative Approach" IEEE Int. Conf. Acoust., Speech Signal Processing, vol. II, pp. 1025-1028, Jul. 2004.

\* cited by examiner

METHOD FOR EVALUATING OVERLAPPING TARGETS

This nonprovisional application is a continuation of International Application No. PCT/EP2018/071730, which was filed on Aug. 10, 2018 which is herein incorporated by reference.

BACKGROUND OF THE INVENTION

Field of the Invention

The present invention relates to a method for evaluating overlapping targets in a radar spectrum. Furthermore, the invention is related to a radar system, a computer program and a computer readable medium.

Description of the Background Art

Automotive radar sensors are gaining more and more attention in advanced driver assistance systems (ADASs), since they are able to monitor vehicle's surroundings to avoid potential dangers. Thanks to the 2-dimensional (2-D) finite Fourier transform (FFT), the target parameters, i. e. the range and relative radial velocity, can be determined as local maxima (peaks) in a range-Doppler (RD) spectrum without lots of computational effort. However, due to the constraints on available bandwidth and memory size of the embedded systems in radar sensors, the Fourier-based estimation cannot provide arbitrary fine range and Doppler resolutions. Each peak in the RD spectrum is assumed to be a single point target. Whereas, in many critical use cases, this assumption could be violated while targets sharing similar range and relative velocities are partially overlapping with each other in the RD spectrum. To overcome those constraints, parametric high resolution algorithms have been mentioned in the publication: F. Engels et al., "*Advances in automotive radar: a framework on computationally efficient high-resolution frequency estimation,*" IEEE Signal Processing Magazine, vol. 34, no. 2, pp. 36-46, Mar. 201. Nevertheless, this requires the number of sources (i. e. targets in the spectrum) to be known a priori.

The publication: T. Fei et al., "*A novel target separation algorithm applied to the two dimensional spectrum for FMCW automotive radar systems*", IEEE Int. Conf. Microwaves, Antennas, Comms. and Elec. Systems, November 2017 discloses that an adaption the matrix pencil method can be used to improve the resolution, wherein the number of dominant singular values of the input data matrix is taken as the estimate for the number of sources by thresholding the singular values.

Furthermore, one-dimensional (1-D) model order selection methods are used to estimate the number of sources before the application of high-resolution algorithms. However, those 1-D MOS methods are designed for the superposition of 1-D exponential signals and are not applicable for 2-D cases.

In consequence, no reliable solution exists that would be capable of estimating the number of sources in a 2-D spectrum, which would be necessary for applying the parametric high-resolution algorithms in the 2-D case.

SUMMARY OF THE INVENTION

It is therefore an object of the present invention to at least partially avoid the previously described disadvantages. Particularly, it is the object of the present invention to provide a reliable solution for estimating the number of overlapping targets in a two-dimensional radar spectrum.

Features and details discussed with respect to the inventive method are also related to features and details discussed with respect to the inventive radar system and/or the computer program and/or the computer readable medium, and/or respectively vice versa.

The problem is particularly being solved by a method for evaluating overlapping targets (sources) in a two-dimensional radar spectrum, wherein the following steps are carried out, particularly one after the other or in any order, wherein single steps can also be performed repeatedly: Providing the two-dimensional radar spectrum, Selecting at least one region of interest as an input signal from the spectrum, wherein preferably the region of interest is smaller than (is only a part of) the whole radar spectrum, particularly with a predetermined size, Performing an evaluation of the input signal to determine an information about the overlapping targets, preferably a number (i. e. the exact quantity) of the targets that overlaps in the region of interest, wherein particularly the evaluation is specific for (or comprise) a model order selection method.

This allows to determine at least one additional information about the overlapping targets, particularly to resolve the overlapping targets. The method therefore has the advantage that a more precise and more reliable evaluation of radar signals can be provided. Particularly, the result of the evaluation can be used for a parametric high-resolution algorithm to determine further parameters for each of the overlapping targets. The two-dimensional radar spectrum is particularly a two-dimensional range-Doppler (RD) spectrum, preferably retrieved from a FMCW (frequency modulated continuous wave radar) automotive radar system (of a vehicle).

Preferably, within the scope of the invention, an overlapping of targets refers to the fact that these overlapping targets cannot be resolved by a peak detection and/or are only visible as one single peak in the spectrum.

It can be possible that the evaluation is performed by using a two-dimensional model order selection method, particularly an ESTER or SAMOS method, wherein preferably the model order selection method is specifically adapted, particularly preferably exclusively, to a two-dimensional form of the input signal. In other words, the two-dimensional model order selection (MOS) method can e. g. comprise one of the following methods: a (two-dimensional) ESTimation Error (ESTER) method and a (two-dimensional) Subspace-based Automatic Model Order Selection (SAMOS) method. The 2D-MOS methods can be provided to estimate the number of neighbouring targets.

It is possible that the 2-D ESTER method is based on the known 1-D ESTER method e. g. disclosed in R. Badeau, B. David, and G. Richard, "*Selecting the modeling order for The Esprit high resolution method: an alternative approach*", IEEE Int. Conf. Acoust., Speech Signal Processing, vol II, pp. 1025-1028, July 2004. Accordingly, the 2-D SAMOS method can be based on the known 1-D SAMOS method, e. g. disclosed in: J.-M. Papy, and L. De Lathauwer, and S. Van Huffel, "*A shift invariance based order-selection technique for exponential data modelling*", IEEE Signal Processing Letters, vol 14, no. 7, pp. 473-476, July 2007.

The MOS methods can be used to estimate the number of targets before the application of (parametric) high-resolution algorithms. Therefore, the methods allow for an estimation of the number of neighbouring (overlapping) targets in a 2-dimensional (2-D) radar spectrum. They can advantageously also be able to automatically estimate the model order without threshold setting. The ESTER and SAMOS can be based on the shift invariance property of the subspace obtained from the singular value decomposition (SVD) of a Hankel matrix. However, conventional ESTER and SAMOS methods are designed for the superposition of 1-D exponential signals, and are not applicable for 2-D cases. Therefore, the MOS methods according to the invention particularly extend the known 1-D ESTER and 1-D SAMOS methods to 2-D applications to estimate the number of sources, i. e. neighbouring targets, in a RD spectrum. Besides, they can be integrated into 2-D subspace-based high resolution algorithms, e. g. as described in Y. Hua, "Estimating two-dimensional frequencies by matrix enhancement and matrix pencil", IEEE Trans. Signal Processing, vol 40, no. 9, pp. 2267-2280, September 1992.

In the following, the MOS methods are described in further detail. However, the following explanations should be understood as being exemplary. The starting point is the input signal (e. g. input data) from the radar, the 2-D signal, x(m,n), which can be modeled as the superposition of multiple 2-D exponentials (e. g. overlapping targets):

$$x(m, n) = \sum_{i=1}^{I} a_i y_i^m z_i^n, \quad (1)$$

$$y_i = \exp(j2\pi f_{1i}), \quad z_i = \exp(j2\pi f_{2i}),$$

$$m = 0, \cdots, M-1, \text{ and } n = 0, \cdots, N-1,$$

where I is the model order (i. e. the number of sources), $(y_i, z_i)$ is the i-th 2-D poles corresponding to the 2-D frequencies $(f_{1i}, f_{2i})$ of the spectrum, and as is the complex amplitude of the i-th source. The input Hankel block matrix with dimension $KL\times(M-K+1)(N-L+1)$ is represented as (compare to Y. Hua, "Estimating two-dimensional frequencies by matrix enhancement and matrix pencil", IEEE Trans. Signal Processing, vol 40, no. 9, pp. 2267-2280, September 1992.):

$$X_e = \begin{pmatrix} X_0 & X_1 & \cdots & X_{M-K} \\ X_1 & X_2 & \cdots & X_{M-K+1} \\ \vdots & \vdots & \vdots & \vdots \\ X_{K-1} & X_K & \cdots & X_{M-1} \end{pmatrix}, \quad (2)$$

where each block is a $L\times(N-L+1)$ Hankel matrix, and it is defined as:

$$X_m = \begin{pmatrix} x(m, 0) & x(m, 1) & \cdots & x(m, N-L) \\ x(m, 1) & x(m, 2) & \cdots & x(m, N-L+1) \\ \vdots & \vdots & \vdots & \vdots \\ x(m, L-1) & x(m, L) & \cdots & x(m, N-1) \end{pmatrix}. \quad (3)$$

Applying the first (1) to the third (3) equation, $X_m$ can be decomposed as:

$$X_m = Z_L A Y_d^m Z_R, \quad (4)$$

$$A = \text{diag}(a_1, a_2, \ldots, a_I), \quad Y_d = \text{diag}(y_1, y_2, \ldots, y_I), \quad (5)$$

the element in e-th row and f-th column of $Z_L$ is given as:

$$Z_L(e,f) = z_f^{e-1}, \quad 1\le e\le L, \quad 1\le f\le I, \quad (6)$$

The element in p-th row and q-th column of $Z_R$ is given as:

$$Z_R(p,q) = z_p^{q-1}, \quad 1\le p\le I \text{ and } 1\le q\le N-L+1. \quad (7)$$

Then, applying equation (4) in equation (2), $X_e$ is decomposed as:

$$X_e = E_L A E_R, \quad (8)$$

where $$E_L = \begin{pmatrix} Z_L \\ Z_L Y_d \\ \vdots \\ Z_L Y_d^{K-1} \end{pmatrix}_{KL\times I}, \quad (9)$$

$$E_R = \begin{pmatrix} Z_R & Y_d Z_R & \cdots & Y_d^{M-K} Z_R \end{pmatrix}_{I\times(N-L+1)(M-K+1)}. \quad (10)$$

Then, the SVD is conducted to $X_e$, and it results:

$$X_e = \sum_{i=1}^{I_{max}} \sigma_i u_i v_i^H = (U_I \ U_n)\begin{pmatrix} \Sigma_I & 0 \\ 0 & \Sigma_n \end{pmatrix}\begin{pmatrix} V_I^H \\ V_n^H \end{pmatrix}, \quad (11)$$

wherein $U_I \in \mathbb{C}^{KL\times I}$ and $V_I \in \mathbb{C}^{(M-K+1)(N-L+1)\times I}$ are the singular vector matrices and contain the I principal components of $X_e$.

$U_n \in \mathbb{C}^{KL\times(I_{max}-I)}$ and $V_n \in \mathbb{C}^{(M-K+1)(N-L+1)\times(I_{max}-I)}$ contain the $(I_{max}-I)$ nonprincipal components.

$\Sigma_I \in \mathbb{R}_{0,+}^{I\times I}$ contains the I nonzero singular values $\sigma_1, \sigma_2, \ldots, \sigma_I$, and the rest $(I_{max}-I)$ singular values $\sigma_{I+1}, \sigma_{I+2}, \ldots, \sigma_{I_{max}}$ in $\Sigma_n$ are equal to zero in noise-free case. As shown in the above-mention publication, Y. Hua, "Estimating two-dimensional frequencies by matrix enhancement and matrix pencil", $U_I$ spans the same signal subspace as the column vectors of $E_L$. Hence, there exists an $I\times I$ nonsingular matrix T, such that $$U_I = E_L T. \quad (12)$$

Using equations (9) and (12) it is defined that $$U^\downarrow = E_L^\downarrow T, \quad U^\uparrow = E_L^\uparrow Y_d T, \quad (13)$$

where superscripts $\downarrow$ and $\uparrow$ denote that the last L and the first L rows of the matrix are deleted, respectively. Then, $U\downarrow$ and $U\uparrow$ have the following relation:

$$U^\uparrow = U^\downarrow Q \text{ with } Q = T^{-1} Y_d T. \quad (14)$$

In the following, the matrices $U_i^\downarrow$ and $U_i^\uparrow$ are defined as the first i column vectors of $U\downarrow$ and $U\uparrow$, respectively. If $i\ne I$, there exists a nonzero residual error $E_1$ (i), which is defined as $\|U_i^\downarrow \tilde{Q} - U_i^\uparrow\|_2^2$, $\tilde{Q} = (U_i^\downarrow)^\dagger U_i^\uparrow$, and $\dagger$ denotes the pseudo-inverse.

Therefore, in the noisy case, the 2-D ESTER estimator predicts the model order, which results into a minimal residual error. It can be deduced as:

$$\hat{I} = \arg\max_i \frac{1}{E_1(i)}, \quad 1\le i < I_{max}, \quad (15)$$

wherein $E_1(i) = \|U_i^\downarrow \tilde{Q} - U_i^\uparrow\|_2^2$, and $\tilde{Q} = (U_i^\downarrow)^\dagger U_i^\uparrow$.

For the 2-D SAMOS, it is formed that the $(KL-L)\times 2i$ matrix $U_i^{tb} = (U_i^\uparrow U_i^\downarrow)$ and it is assumed that $KL-L\le 2I$. After a SVD it applied to $U_i^{tb}$, it follows that $U_i^{tb} = Y_i \Gamma_i W_i^H$, where $Y_i \in \mathbb{C}^{(KL-L) \times 2i}$, $W_i \in \mathbb{C}^{2i \times 2i}$ and $\Gamma_i = \text{ding}\{\gamma_1, \gamma_2, \ldots, \gamma_{2i}\}$ containing the singular values of $U_i^{tb}$. The 2-D SAMOS estimator is build as:

$$\hat{I} = \arg\max_i \frac{1}{E_2(i)}, 1 \le i < \min\left(\text{floor}\left(\frac{KL-L}{2}\right), I_{max}\right), \quad (16)$$

wherein $$E_2(i) = \frac{1}{i} \sum_{k=i+1}^{2i} \gamma_k,$$

and $\gamma_k$ is the k-th singular value of $U_i^{tb}$ and $U_i^{tb} = (U_i^\uparrow \; U_i^\downarrow)$.

Based on the above-mentioned considerations, the two MOS methods can e. g. be implemented in the following way. As mentioned above, this concrete implementation of the methods is given only by way of example. The following steps can be particularly carried out one after the other as part of the method (the evaluation step) according to the invention. First, a first processing part can be carried out by the following steps:

Arranging the input signal, particularly input radar data, into a Hankel block matrix ($X_e$),
Applying the singular value decomposition (SVD) to the Hankel block matrix to obtain the singular vector matrix (U) of the Hankel block matrix ($X_e$),
Obtaining $U^\uparrow$ by deleting the first L rows of U,
Obtaining $U^\downarrow$ by deleting the last L rows of U, It is assumed that is the possible model order. After the first processing part, a main processing part can be carried out, wherein the model order is estimated via one of the two different MOS methods, i. e. the 2-D ESTER and the 2-D SAMOS.

For the 2-D ESTER, the following steps can be carried out in the main processing part:

Defining a residual error, e. g.: $\Sigma_1(i) = \|U_i^\downarrow \tilde{Q} - U_i^\uparrow\|_2^2$, and $Q = (U_i^\downarrow)^\dagger U_i^\uparrow$
Determining the residual error for all possible model order i,
Determining the minimum of the determined residual errors,
Then the i, which leads to the minimal residual error, can be considered as the estimated model order $\hat{I}$, which can be explained by equation (15).

For the 2-D SAMOS, the following steps can be carried out in the main processing part:

Obtaining $U_i^\uparrow$ by taking the first i columns of $U^\uparrow$,
Obtaining $U_i^\downarrow$ by taking the first i columns of $U_\downarrow$,
Forming a matrix $U_i^{tb}$ by concatenating $U_u^\uparrow$ and $U_i^\downarrow$ as $U_i^{tb} = (U_i^\uparrow \; U_i^\downarrow)$ ($U_i^{tb}$ can have the same number of rows as $U_i^\uparrow$ and $U_i^\downarrow$ but doubled number of columns),
Applying the SVD to $U_i^{tb}$ and obtain the corresponding singular values,
Defining an error $$E_2(i) = \frac{1}{i} \sum_{k=i+1}^{2i} \gamma_k,$$

$\gamma k$ is the k-th singular values of $U_i^{tb}$,
Determining the error for all possible model order i,
Determining the minimum of the determined errors, The i, which leads to the minimal error, is considered as the estimated model order $\hat{I}$. This can be further explained by equation (16).

The result $\hat{I}$ of the 2-D MOS methods can be further utilized by some high-resolution algorithms, e. g. 2-D multiple signal classification (MUSIC), 2-D estimation of parameters via rotational invariant techniques (ESPRIT), or matrix enhancement and matrix pencil (MEMP), which are able to estimate the range, relative radial velocity and complex amplitude (phase) of overlapping targets. However, those high-resolution algorithms require the number of overlapping targets known as a priori.

Conventionally, the number of targets is estimated as the number of peaks in the 2-D spectrum, and the target parameters (range and relative velocity) are obtained from the peak position in the 2-D spectrum. However, this does not allow to resolve overlapping targets by the use of high-resolution algorithms. The invention can address this issue by providing the result $\hat{I}$ (the estimated model order) as the required number of oberlapping targets.

MUSIC is e. g. described in: Y. Hua, and T. Sarkar, "*Matrix pencil method for estimating parameters of exponentially damped/undamped sinusoids in noise*", IEEE Trans. Acoust., Speech and Signal Processing, vol 38, no. 5, pp. 814-824, May 1990.

ESPRIT is e. g. described in: M. Wax and T. Kailath, "*Detection of signals by information theoretic criteria*", IEEE Trans. Acoust., Speech and Signal Processing, vol 33, no. 2, pp. 387-392, April 1985.

MEMP is e. g. described in: R. Badeau, B. David, and G. Richard, "*Selecting the modeling order for The Esprit high resolution method: an alternative approach*", IEEE Int. Conf. Acoust., Speech Signal Processing, vol II, pp. 1025-1028, July 2004.

Furthermore, it is conceivable that the determined information about the overlapping targets is an estimated (quantitative) number of the overlapping targets, and preferably after the step of performing the evaluation, the following step is carried out: Performing a (particularly parametric) high-resolution algorithm using the estimated number of the overlapping targets and the input signal to estimate at least one parameter of the overlapping targets, particularly a range and/or a relative radial velocity and/or a complex amplitude of (each of) the overlapping targets.

The high-resolution algorithm can particularly be based on one of the following: a 2-D multiple signal classification (MUSIC), a 2-D estimation of parameters via rotational invariant techniques (ESPRIT), a matrix enhancement and matrix pencil (MEMP) method. These are able to estimate the range, relative radial velocity and complex amplitude (phase) of overlapping targets very reliably.

According to the invention, it is possible that (e. g. after the step of providing and before the step of selecting) at least the following step is performed: Detecting of peaks (i. e. at least one peak) in the provided spectrum, particularly by a peak detection method, wherein the step of selecting can preferably comprise at least the following step: Selecting the at least one region of interest depending on at least one of the detected peaks, wherein particularly each of the at least one region of interest is being selected around (including) one different of the detected peaks, each providing one input signal, wherein for every of the provided at least one input signal the evaluation is performed to determine the information about the overlapping targets for each of the at least one input signal, wherein particularly the overlapping targets for one respective input signal correspond to the one peak of this input signal. This can have the effect that only parts of the frequency signals from the whole 2D spectrum are analyzed to estimate the number of overlapping targets. This can reduce the computational effort for the evaluation. However, alternatively, the region of interest can also be equal to the whole provided spectrum.

According to another aspect of the invention, it is possible that for providing each of the at least one input signal a two-dimensional spectrum processing, particularly a transform, preferably a two-dimensional inverse finite Fourier transform, is applied to each of the at least one region of interest to determine at least one respective transformed region of interest. This can be necessary since the input signal of the 2-D MOS method is in the time domain.

Particularly it can be provided that after the two-dimensional spectrum processing for each of the at least one respective transformed region of interest a windowing compensation is performed for a determination of each of the at least one input signal. Windowing effects should be compensated when the window function is not included in the signal model of the 2-D MOS method. Therefore, this step can improve the estimation accuracy. The windowing effect can be compensated by dividing the corresponding used window function.

It can be possible that the evaluation comprises the determination of a Hankel block matrix and/or the determination of a singular value decomposition of the Hankel block matrix from the input signal. This particularly allows for a reliable estimation of the number of targets.

The invention also relates to a radar system, particularly FMCW radar system, preferably of a vehicle like a passenger and/or autonomous car, for evaluating overlapping targets in a two-dimensional radar spectrum, comprising an evaluation unit suitable for carrying out the following steps, particularly corresponding to a method according to the invention: providing the two-dimensional radar spectrum, selecting at least one region of interest as an input signal from the spectrum, and performing an evaluation of the input signal to determine an information about the overlapping targets, wherein the evaluation is specific for a model order selection method.

Therefore, the radar system according to the invention can offer the same advantages as those described for the method according to the invention. Furthermore, the radar system according to the invention can be suitable to be operated by the method according to the invention.

The invention also relates to a computer program, particularly computer program product, comprising instructions, which, when the computer program is executed by a computer, causes the computer to carry out the steps of a method according to the invention.

Furthermore, the invention relates to a computer readable medium having stored thereon the computer program according to the invention. The computer readable medium can particularly be embodied as a hard drive or a flash memory or a downloadable software.

Therefore, the computer program and the computer readable medium according to the invention can offer the same advantages as those described for the method according to the invention. Furthermore, the computer program and the computer readable medium according to the invention can be suitable to provide a method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
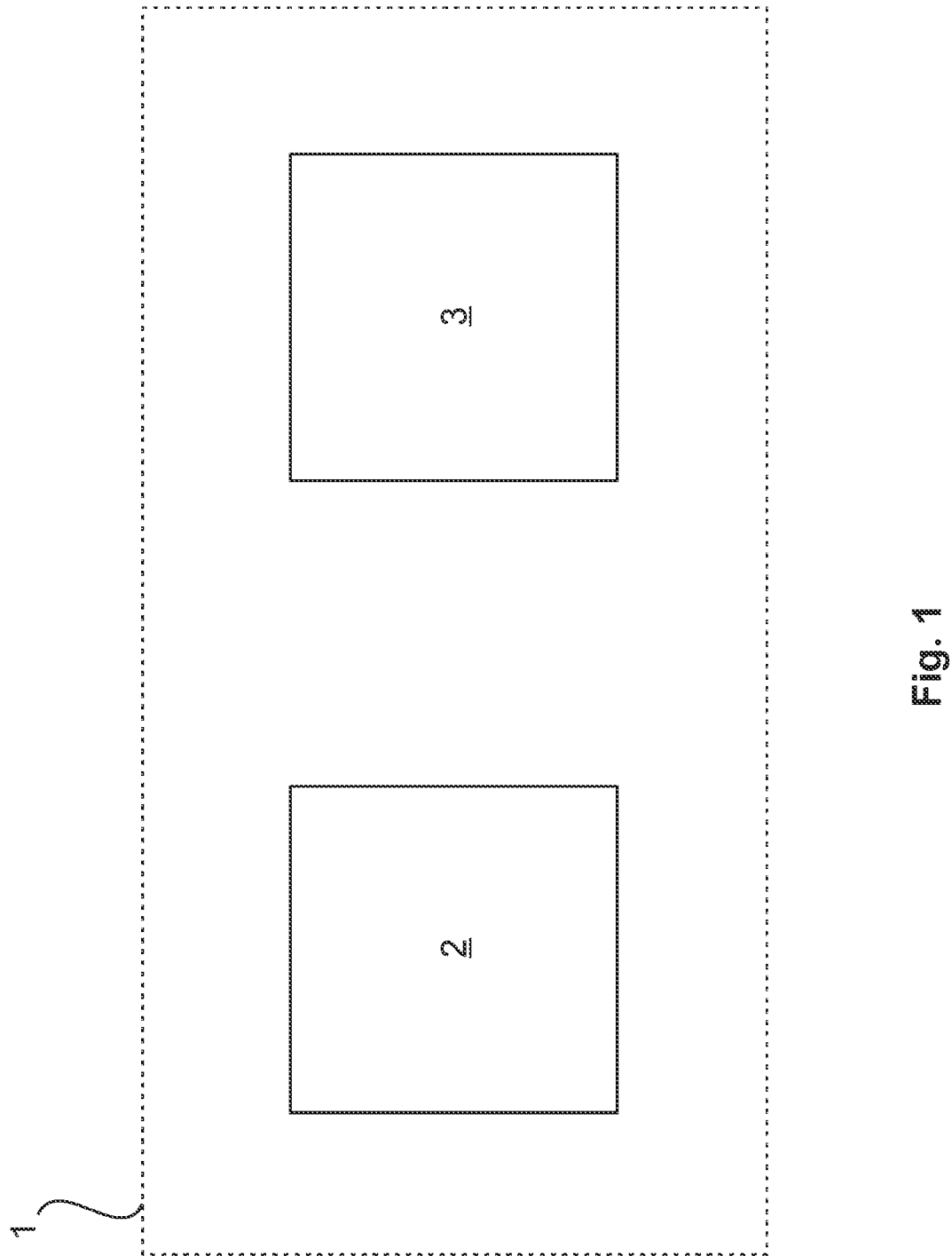
FIG. 1 is a schematic visualisation of a method according to the invention and a radar system according to the invention.

FIG. 1 shows a radar system 1 for a visualisation of a method according to the invention. The system 1 can comprise an evaluation unit 2, which can be embodied as a computer 2 or processor 2 or the like. Furthermore, a data storage unit 3 of the system 1 can be provided, particularly integrated into the evaluation unit 2. The data storage unit 3 can be embodied as a computer readable medium according to the invention so that a computer program according to the invention is stored thereon. This allows the evaluation unit 2 to read the computer program from the data storage unit 3 for executing the computer program and thereby performing the method according to the invention. Therefore, the evaluation unit 2 can be connected to another component of the radar system 1, like an analog-to-digital converter or another processor of the system 1, for receiving a signal specific for a detection of the radar system 1. Afterwards, this signal can be processed for providing a two-dimensional radar spectrum 100.

Figure 2:
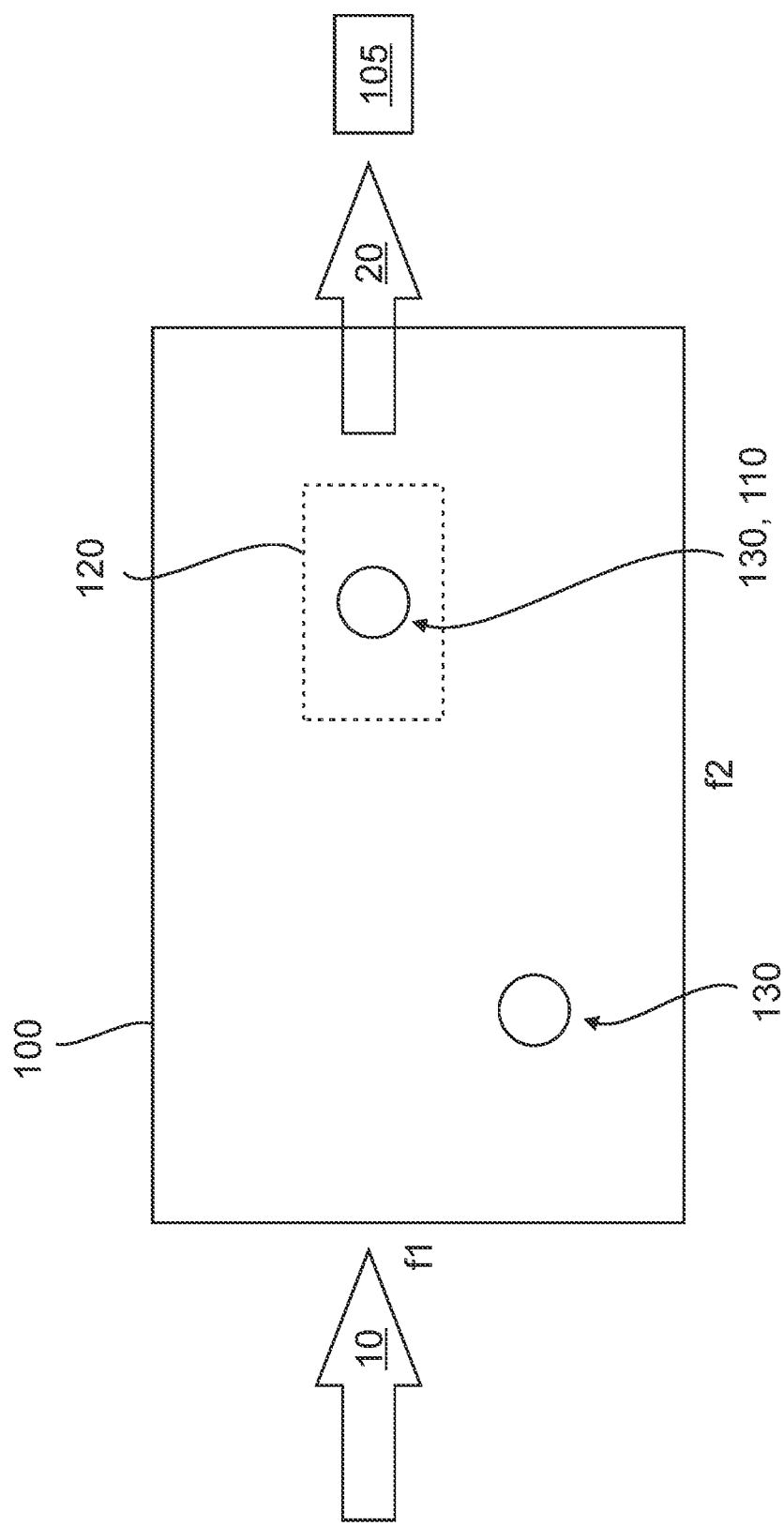
FIG. 2 is a further schematic visualisation of a method according to the invention.
Figure 3:
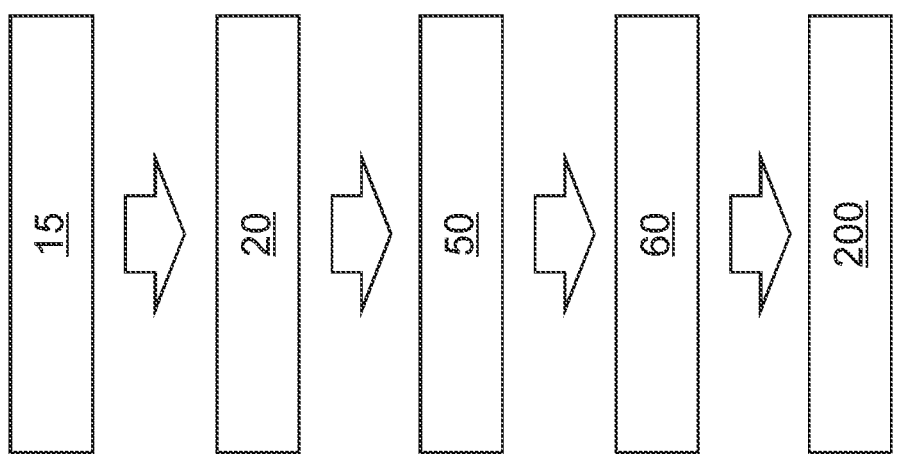
FIG. 3 is a further schematic visualisation of a method according to the invention.

With reference to FIGS. 2 and 3, a method according to the invention is further illustrated. The method according to the invention can serve for evaluating overlapping targets 110 in a two-dimensional radar spectrum 100. Therefore, at first a providing 10 the two-dimensional radar spectrum 100 can be performed. This is exemplarily described in more detail in the following.

The radar system 1 can particularly have at least one sensor (e. g. either 24 GHz or 77 GHz) that utilize the concept of fast chirp sequences as transmit signal modulation schema to determine the parameters of targets, i. e. range, relative velocity and angle. It can be provided that in every measurement cycle, this modulation schema sequentially transmits N frequency chirps within the duration $T_1$, and the duration of a chirp is then $T_1/N$. The current transmit frequency of the chirp is linearly changed within the transmit bandwidth B (linear frequency modulation). The processing of receive signal data can be carried out adjacently after $T_1$ in a period of $T_2-T_1$, such that the whole measurement cycle duration comes up to $T_2$.

Furthermore, the radar system 1 can advantageously provide at least one transmit antenna and up to three receive antenna with which a quadrature demodulator is applied to at least one receive antenna. The receive antennas can be arranged equidistantly with a distance $d_R$ in x-direction. The transmit signal will be backscattered to a radar sensor of the radar system 1 if it reaches an object. This reflected signal can firstly be demodulated into baseband at the receiver and subsequently be sampled by an analog-to-digital converter (ADC). Till the time point these data of all receive antennas is stored e. g. in 3 blocks, each of which is an ADC data matrix with M times N (M samples per chirp, and N chirps). The ADC data matrix obtained by the quadrature demodulator contains complex valued data. Afterwards, these 2D-baseband ADC signals are transformed into the 2D frequency domain by 2D discrete Fourier transform. The resulting signals form a two-dimensional spectrum 100 that represents a superposition of the reflection of relevant targets and unexpected signals, which are for instance termed as noise. FIG. 2 shows a respective two-dimensional spectrum 100 resulting from the 2D Fourier transform with two frequencies f1 and f2. As shown by way of example, two relevant targets are detected, and each is highlighted as a peak 130.

The peak parameters, i. e., two basic frequencies f1 (1st dimension) and f2 (2nd dimension), can be particularly extracted through a peak detection algorithm. The number of targets can be estimated as the number peaks 130 in the 2D spectrum 100. The frequency f1 can be exclusively dependent on the distance R of a target and the frequency f2 can be dependent on the relative speed v of this target corresponding to the peak 130.

Due to the constraints on available bandwidth and memory size of the embedded systems in the radar sensor of the radar system 1, it is possible that the Fourier-based estimation cannot provide the necessary fine range and Doppler resolutions for a specific use cases. As mentioned before, each peak 130 in the 2-D spectrum 100 is assumed to be a single point target. Whereas, in many critical use cases, this assumption could be violated while multiple targets could share similar range and relative velocities and partially overlap with each other in the 2D spectrum 100. After performing a peak detection 15, this can result in multiple overlapping targets 110 represented all by a single peak 130. Therefore, conventional peak detection algorithms are not able to resolve the multiple targets and therefore interpret a single peak 130 only as a single target. However, for a correct interpretation of the spectrum 100 more than one target must be evaluated for this peak 130. A method according to the invention can preferably be used to overcome this issue.

For this purpose, according to FIG. 2, firstly a region of interest 120 is selected around a single detected peak 130. At this stage, it is not known if this peak 130 comprise more than one single target. In other words, the following steps of the method according to the invention serve to determine if this specific peak 130 within the region of interest 120 comprises overlapping targets 110. More specifically, also the number of overlapping targets 110 can be determined.

After the selecting 20 of the at least one region of interest 120 as an input signal 105 from the spectrum 100 has been performed, particularly with a predefined pixel region around the peak 130, an evaluation 200 of the input signal 105 can be performed to determine an information about the overlapping targets 110 (like the number of overlapping targets 110). This evaluation 200 can be specific for a model order selection method.

According to FIG. 3, after performing the peak detection 15 and the selecting 20 of the at least one region of interest 120, for providing one input signal 105 for each region of interest 120 a two-dimensional spectrum processing 50, particularly a transform, preferably a two-dimensional inverse finite Fourier transform, can be applied to each region of interest 120 to determine at least one respective transformed region of interest 120. Furthermore, after the two-dimensional spectrum processing 50 for each of the at least one respective transformed region of interest 120 a windowing compensation 60 can be performed for a determination of each of the at least one input signal 105. The evaluation 200 can then be carried out using the input signal 105, to determine the parameter about the overlapping targets 110, like a number of overlapping targets 110 represented by the single peak 130. This result of the evaluation 200 can further be used as input for high-resolution algorithm which allows to determine further parameters of each of the overlapping targets 110.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for evaluating overlapping targets in a two-dimensional radar spectrum, the method comprising:
   transmitting a radar signal;
   receiving, by a sensor of a radar system, the radar signal as an input signal, which has been backscattered to the sensor;
   processing the input signal received by the radar system to provide the two-dimensional radar spectrum;
   selecting at least one region of interest as the input signal from the spectrum, the region of interest being less than an entirety of the spectrum;
   performing, using a processor, an evaluation of the input signal to determine an information about the overlapping targets, the information comprising an exact number of targets of the overlapping targets, which are distinguished by said performing the evaluation, the evaluation comprising a two-dimensional model order selection method specifically adapted to a two-dimensional form of the input signal; and
   after said performing the evaluation, performing, using the processor, a high-resolution algorithm using the information about the overlapping targets and the input signal to estimate a parameter of the overlapping targets,
   wherein the information about the overlapping targets and the input signal are separate inputs to said high-resolution algorithm, and
   wherein the parameter of the overlapping targets is a range of the overlapping targets, a relative radial velocity of the overlapping targets, or a complex amplitude of the overlapping targets.

2. The method according to claim 1, wherein after the step of providing and before the step of selecting, at least the following is performed:
   detecting of peaks in the provided spectrum;
   wherein the step of selecting comprises selecting the at least one region of interest depending on at least one of the detected peaks, wherein each of the at least one region of interest is being selected around one different of the detected peaks each providing one input signal,
   wherein for every of the provided at least one input signal the evaluation is performed to determine the information about the overlapping targets for each of the at least one input signal, and
   wherein the overlapping targets for one respective input signal correspond to the one peak of this input signal.

3. The method according to claim 2, wherein, for providing each of the at least one input signal, a two-dimensional spectrum processing or a transform or a two-dimensional inverse finite Fourier transform is applied to each of the at least one region of interest to determine at least one respective transformed region of interest.

4. The method according to claim 3, wherein after the two-dimensional spectrum processing for each of the at least one respective transformed region of interest, a windowing compensation is performed for a determination of each of the at least one input signal.

5. The method according to claim 2, wherein, for providing each of the at least one input signal, a two-dimensional spectrum processing is applied to each of the at least one region of interest to determine at least one respective transformed region of interest.

6. The method according to claim 2, wherein, for providing each of the at least one input signal, a two-dimensional inverse finite Fourier transform is applied to each of the at least one region of interest to determine at least one respective transformed region of interest.

7. The method according to claim 1, wherein the evaluation comprises the determination of a Hankel block matrix and/or the determination of a singular value decomposition of the Hankel block matrix from the input signal.

8. A non-transitory computer readable medium having stored thereon a computer program comprising instructions, which, when the computer program is executed by a computer, causes the computer to carry out the method according to claim 1.

9. The method according to claim 1, wherein the two-dimensional radar spectrum is a two-dimensional range-Doppler spectrum.

10. The method according to claim 1, wherein the two-dimensional radar spectrum is retrieved from a frequency modulated continuous wave radar automotive radar system.

11. The method according to claim 1, wherein the overlapping targets are targets that cannot be resolved by peak detection and are visible as one single peak in the two-dimensional radar spectrum.

12. The method according to claim 1, wherein the parameter of the overlapping targets is outputted and used in making decisions during automated driving.

13. A radar system for evaluating overlapping targets in a two-dimensional radar spectrum, the radar system comprising:
　a transmitter configured to transmit a radar signal;
　a sensor configured to receive the radar signal as an input signal, which has been backscattered to the sensor; and
　an evaluation unit adapted to:
　　process an input signal received by the radar system to provide the two-dimensional radar spectrum;
　　select at least one region of interest as the input signal from the spectrum, the region of interest being less than an entirety of the spectrum; and
　　perform an evaluation of the input signal to determine an information about the overlapping targets, the information comprising an exact number of targets of the overlapping targets, which are distinguished by said evaluation; and
　　after the evaluation is performed, perform a high-resolution algorithm using the information about the overlapping targets and the input signal to estimate a parameter of the overlapping targets,
　wherein the evaluation comprises a two-dimensional model order selection method specifically adapted to a two-dimensional form of the input signal,
　wherein the information about the overlapping targets and the input signal are separate inputs to said high-resolution algorithm, and
　wherein the parameter of the overlapping targets is a range of the overlapping targets, a relative radial velocity of the overlapping targets, or a complex amplitude of the overlapping targets.

14. A method for evaluating overlapping targets in a two-dimensional radar spectrum, the method comprising:
　processing an input signal received by the radar system to provide the two-dimensional radar spectrum;
　selecting at least one region of interest as the input signal from the spectrum, the region of interest being less than an entirety of the spectrum;
　performing, using a processor, an evaluation of the input signal to determine an information about the overlapping targets, the information comprising an exact number of targets of the overlapping targets, which are distinguished by said performing the evaluation, the evaluation comprising a two-dimensional model order selection method specifically adapted to a two-dimensional form of the input signal; and
　after said performing the evaluation, performing, using the processor, a high-resolution algorithm using the information about the overlapping targets and the input signal to estimate a parameter of the overlapping targets,
　wherein the information about the overlapping targets and the input signal are separate inputs to said high-resolution algorithm,
　wherein the parameter of the overlapping targets is a range of the overlapping targets, a relative radial velocity of the overlapping targets, or a complex amplitude of the overlapping targets, and
　wherein the parameter of the overlapping targets is outputted and used in making decisions during automated driving.

\* \* \* \* \*